(12) United States Patent
Murakami (10) Patent No.: US 11,092,336 B2
(45) Date of Patent: Aug. 17, 2021

(54) METHOD FOR ESTIMATING WATER CONTENT, AND ESTIMATION DEVICE

(71) Applicant: DENSO WAVE INCORPORATED, Aichi-pref. (JP)

(72) Inventor: Yotaro Murakami, Aichi-pref. (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 177 days.

(21) Appl. No.: 16/543,729

(22) Filed: Aug. 19, 2019

(65) Prior Publication Data
US 2020/0088406 A1    Mar. 19, 2020

(30) Foreign Application Priority Data

Sep. 18, 2018 (JP) .............................. JP2018-173675

(51) Int. Cl.
| | |
|---|---|
| *F23N 5/00* | (2006.01) |
| *F02D 41/14* | (2006.01) |
| *F23N 5/18* | (2006.01) |
| *F23N 5/26* | (2006.01) |
| *F02M 26/46* | (2016.01) |

(Continued)

(52) U.S. Cl.
CPC .......... *F23N 5/184* (2013.01); *F02D 41/0045* (2013.01); *F02M 26/46* (2016.02); *F23N 5/006* (2013.01); *F23N 5/265* (2013.01); *F02D 2041/1472* (2013.01); *F23N 2225/26* (2020.01); *F23N 2225/30* (2020.01); *G06F 17/11* (2013.01)

(58) Field of Classification Search
CPC ...... F23N 5/003; F23N 5/006; F23N 2225/26; F23N 2225/30; F23N 2900/05001; F23N 2900/05003; F02D 41/1444; F02D 41/1446; F02D 41/1452; F02D 41/1453; F02D 41/1454; F02D 41/1458; F02D 41/1461; F02D 41/1462; F02D 41/1472
See application file for complete search history.

(56) References Cited

U.S. PATENT DOCUMENTS

| | | | |
|---|---|---|---|
| 5,732,664 A * | 3/1998 | Badeaux, Jr. ......... | F22B 35/008 122/1 R |
| 5,938,423 A | 8/1999 | Nishiyama et al. | |
| 9,879,626 B1 * | 1/2018 | Mavalankar ....... | F02M 35/1038 |

(Continued)

FOREIGN PATENT DOCUMENTS

| | | | | |
|---|---|---|---|---|
| JP | H09-310844 A | | 12/1997 | |
| JP | 3080009 B2 | | 8/2000 | |
| WO | WO 2014-120070 | * | 8/2014 | ............. F02D 41/14 |

*Primary Examiner* — Erick R Solis
(74) *Attorney, Agent, or Firm* — Harness, Dickey & Pierce, P.L.C.

(57) ABSTRACT

In a method for estimating water content of exhaust gas, a first gas concentration at a first position in an exhaust passage, a second gas concentration at a second position downstream of the first position, and a gas temperature at the second position are obtained. A saturated water vapor at the gas temperature is calculated as a water content at the second position. By using the water content at the second position and the second gas concentration, an excess air amount of a fuel-air mixture supplied to a combustion apparatus is calculated based on a chemical reaction formula of combustion of the mixture. By using the excess air amount and the first gas concentration, a water content at the first position is estimated.

8 Claims, 5 Drawing Sheets

(51) Int. Cl.
*F02D 41/00* (2006.01)
*G06F 17/11* (2006.01)

(56) References Cited

U.S. PATENT DOCUMENTS

| | | | |
|---|---|---|---|
| 2008/0102411 A1* | 5/2008 | Longardner | F23L 15/00 |
| | | | 431/2 |
| 2009/0120382 A1* | 5/2009 | Min | F23N 5/006 |
| | | | 122/14.2 |
| 2014/0202426 A1* | 7/2014 | Surnilla | F02D 19/088 |
| | | | 123/349 |
| 2015/0033757 A1* | 2/2015 | White | F01D 17/02 |
| | | | 60/783 |
| 2016/0245198 A1* | 8/2016 | Surnilla | G01N 27/419 |
| 2018/0038255 A1* | 2/2018 | Garimella | F02D 35/02 |

* cited by examiner

$$CH_4 + N \times 2(O_2 + 3.76N_2)$$
$$\rightarrow CO_2 + 2H_2O + (2N-2)O_2 + 7.52N \times N_2 \quad \cdots (1)$$

$$O_{2C} = \frac{2N-2}{1+\alpha+2N-2+7.52N} = \frac{2N-2}{\alpha+9.52N-1} \quad \cdots (2)$$

$$O_{2CA} = \frac{2N-2}{\alpha_A + 9.52N - 1} \quad \cdots (3)$$

$$\alpha_A = \frac{2N-2}{O_{2CA}} - 9.52N + 1 \quad \cdots (4)$$

$$W_{cA} = \frac{\alpha_A}{\alpha_A + 9.52N - 1}$$
$$= \frac{2N - 2 - 9.52N \times O_{2CA} + O_{2CA}}{2N - 2} \quad \cdots (5)$$

FIG. 5

$$O_{2CB} = \frac{2N - 2}{\alpha_B + 9.52N - 1} \quad \cdots (6)$$

$$\alpha_B = \frac{2N - 2}{O_{2CB}} - 9.52N + 1 \quad \cdots (7)$$

$$W_{cB} = \frac{\alpha_B}{\alpha_B + 9.52N - 1}$$
$$= \frac{2N - 2 - 9.52N \times O_{2CB} + O_{2CB}}{2N - 2} \quad \cdots (8)$$

$$V(T) = \frac{217 \times 6.11 \times 10^{\frac{7.5T}{T+237.3}}}{T + 273.15} \quad \cdots (9)$$

$$N_{2C} = \frac{7.52N}{1 + \alpha + 2N - 2 + 7.52N} = \frac{7.52N}{\alpha + 9.52N - 1} \quad \cdots (10)$$

$$N_{2CA} = \frac{7.52N}{\alpha_A + 9.52N - 1} \quad \cdots (11)$$

$$N_{2CB} = \frac{7.52N}{\alpha_B + 9.52N - 1} \quad \cdots (12)$$

FIG. 6

METHOD FOR ESTIMATING WATER CONTENT, AND ESTIMATION DEVICE

CROSS REFERENCE TO RELATED APPLICATION

The present application claims the benefit of priority from Japanese Patent Application No. 2018-173675 filed on Sep. 18, 2018. The entire disclosure of the above application is incorporated herein by reference.

TECHNICAL FIELD

The present disclosure relates to a method and a device for estimating water content contained in exhaust gas.

BACKGROUND

Conventionally, for example, a system for controlling a combustion state in a combustion apparatus, such as an engine or a gas water heater, has been proposed, in which a sensor is provided in an exhaust passage to measure a gas concentration in exhaust gas, such as oxygen concentration, carbon monoxide concentration or nitrogen oxide concentration.

SUMMARY

According to at least one embodiment of the present disclosure, a method for estimating water content of exhaust gas is introduced. In the estimation method, a first gas concentration that is a concentration of the exhaust gas detected at a first position in an exhaust passage through which the exhaust gas of a combustion apparatus flows, a second gas concentration that is a concentration of the exhaust gas detected at a second position which is downstream of the first position in the exhaust passage and where a temperature of the exhaust gas is lower than 100° C., and a gas temperature that is the temperature of the exhaust gas detected at the second position are obtained. A saturated water vapor amount at the gas temperature is calculated as a water content at the second position. An excess air amount of a fuel-air mixture supplied to the combustion apparatus is calculated by using the water content at the second position and the second gas concentration based on a chemical reaction formula of combustion of the mixture. A water content at the first position is estimated by using the excess air amount and the first gas concentration based on the chemical reaction formula. A combustion control of the combustion apparatus is performed based on the water content at the first position.

DETAILED DESCRIPTION

For example, a system for controlling a combustion state in a combustion apparatus, such as an engine or a gas water heater, includes a sensor provided in an exhaust passage to measure a gas concentration in exhaust gas, such as oxygen concentration, carbon monoxide concentration or nitrogen oxide concentration.

Water generated by combustion reaction is contained as a gas in the exhaust gas, and the gaseous water condenses into a liquid as the temperature decreases. The water present as a gas may affect the detected gas concentration.

Such affection of the water can be prevented if the sensor is installed in an area where an evaporation amount of water is constant, for example, an area where the temperature of exhaust gas in a combustion chamber is higher than 100° C. and all the water is considered to be evaporated.

However, because the combustion chamber is heated to a high temperature, the temperature may exceed the allowable temperature of the sensor. In addition, it is quite difficult to verify the installation position of the sensor in the combustion chamber where the temperature does not exceed the allowable temperature of the sensor. For example, if an unexpected temperature rise occurs due to heat convection or the like, the sensor may be damaged. Thus, it is necessary to search for a position where such a temperature rise does not occur. However, for example, even if a suitable installation position is found in a certain combustion apparatus, the installation position may not be applied to other combustion devices having different structures.

Also, in the case of the combustion apparatus having a heat exchanger such as a gas water heater, for example, the temperature of the exhaust gas may drop sharply to 100° C. or less. From this, when a sensor is provided in the exhaust passage, the water vapor in the exhaust gas condenses and becomes liquid as the temperature of the exhaust gas decreases. As a result, the gas concentration changes depending on the position where the sensor is installed, and correct detection by the sensor cannot be performed.

The present disclosure provides an estimation method and an estimation device capable of performing estimation of water content in an exhaust gas pipe for detecting gas concentration appropriately while a degree of freedom in installation position of a gas concentration sensor is enhanced.

According to an aspect of the present disclosure, a method for estimating water content of exhaust gas is introduced. In the estimation method, a first gas concentration that is a concentration of the exhaust gas detected at a first position in an exhaust passage through which the exhaust gas of a combustion apparatus flows, a second gas concentration that is a concentration of the exhaust gas detected at a second position which is downstream of the first position in the exhaust passage and where a temperature of the exhaust gas is lower than 100° C., and a gas temperature that is the temperature of the exhaust gas detected at the second position are obtained. A saturated water vapor amount at the gas temperature is calculated as a water content at the second position. An excess air amount of a fuel-air mixture supplied to the combustion apparatus is calculated by using the water content at the second position and the second gas concentration based on a chemical reaction formula of combustion of the mixture. A water content at the first position is estimated by using the excess air amount and the first gas concentration based on the chemical reaction formula. A combustion control of the combustion apparatus is performed based on the water content at the first position.

In the estimation method, the first gas concentration may be corrected by using the excess air amount and the estimated water content at the first position based on the chemical reaction formula. The combustion control may be performed based on the corrected first gas concentration.

In the estimation method, a number of moles of gaseous water at the first position may be estimated by using the excess air amount and the first gas concentration based on the chemical reaction formula. The correction of the first gas concentration may be performed based on the estimated number of moles.

In the estimation method, the calculation of the saturated water vapor amount may be performed when a difference between the first gas concentration and the second gas concentration is larger than or equal to a predetermined value.

When the fuel burns, water is produced, and the water is vapor if the temperature of the exhaust gas is 100° C. or higher, but partially condenses and is discharged from the exhaust gas if the temperature of the exhaust gas becomes less than 100° C. Therefore, even if the absolute amount of the gas to be detected is constant, the concentration of the gas is relatively low if the water content in the exhaust gas is large, and relatively high if the water content is small. That is, when the temperature of the exhaust gas changes, the produced water affects the detected gas concentration, and the detected gas concentration deviates from the true value according to the temperature of the exhaust gas.

In this case, if the sensor is installed at a position where all the water is considered to be evaporated, such as inside a combustion chamber over 100° C., the detected value may not be affected by the water. However, the sensor may be damaged. In the case where the sensor is installed in the exhaust passage, it is assumed that the temperature of the exhaust gas drops sharply, and the possibility of being affected by water due to a change in the amount of water vapor in the exhaust gas becomes higher.

Therefore, in the present disclosure, the second position is set downstream of the first position and separated by the predetermined distance from the first position. In other words, the first gas concentration is considered to be changed at the second position. The water content in the exhaust gas at the second position is calculated as the saturated water vapor amount at the gas temperature. Accordingly, the water content in the exhaust gas at the second position can be specified.

Then, the excess air amount of the fuel-air mixture supplied to the combustion apparatus is calculated by using the water content at the second position and the second gas concentration based on the chemical reaction formula of combustion of the mixture. Since the excess air amount is the same value at both the first position and the second position, once the excess air amount can be determined, the water content at the first position can be estimated based on the chemical reaction formula of combustion of the mixture at the first position.

Thus, by setting the second position as described above, the water content at the first position can be estimated regardless of whether the exhaust gas is saturated at the first position. Therefore, the first position does not have to be set at a position where the temperature of the exhaust gas is higher than 100° C. so as not to be affected by water, and a risk of damage to the detection sensor can be reduced. Further, even if the first position is set to a position affected by water, the water content can be estimated regardless of the state of the exhaust gas at the first position by providing the determination sensor at the second position. Therefore, the first position can be set to an arbitrary position, and verification of whether the first position is appropriate can be easily performed. Therefore, the degree of freedom of the position where the detection sensor is installed can be increased. Further, estimation of the water content in the exhaust gas pipe for appropriate detection of gas concentration can be performed by the sensor for detecting the gas concentration.

According to another aspect of the present disclosure, an estimation device for estimating water content of exhaust gas includes a detection sensor provided at a first position in an exhaust passage through which exhaust gas of a combustion apparatus flows. The detection sensor detects a first gas concentration which is a concentration of the exhaust gas at the first position. A determination sensor is provided at a second position which is downstream of the first position in the exhaust passage and where a temperature of the exhaust gas is lower than 100° C. The determination sensor detects a second gas concentration which is a concentration of the exhaust gas at the second position. A temperature sensor is provided at the second position and detects a gas temperature which is the temperature of the exhaust gas at the second position. A controller is programmed to calculate a saturated water vapor amount at the gas temperature as a water content at the second position, calculate an excess air amount of a fuel-air mixture supplied to the combustion apparatus by using the water content at the second position and the second gas concentration based on a chemical reaction formula of combustion of the mixture, estimate a water content at the first position by using the excess air amount and the first gas concentration based on the chemical reaction formula, and perform a combustion control of the control apparatus based on the water content at the first position.

The controller may correct the first gas concentration by using the excess air amount and the estimated water content at the first position based on the chemical reaction formula, and perform the combustion control based on the corrected first gas concentration.

The controller may estimate a number of moles of gaseous water at the first position by using the excess air amount and the first gas concentration based on the chemical reaction formula, and correct the first gas concentration based on the estimated number of moles.

The controller may calculate the saturated water vapor amount when a difference between the first gas concentration and the second gas concentration is larger than or equal to a predetermined value.

Figure 1:
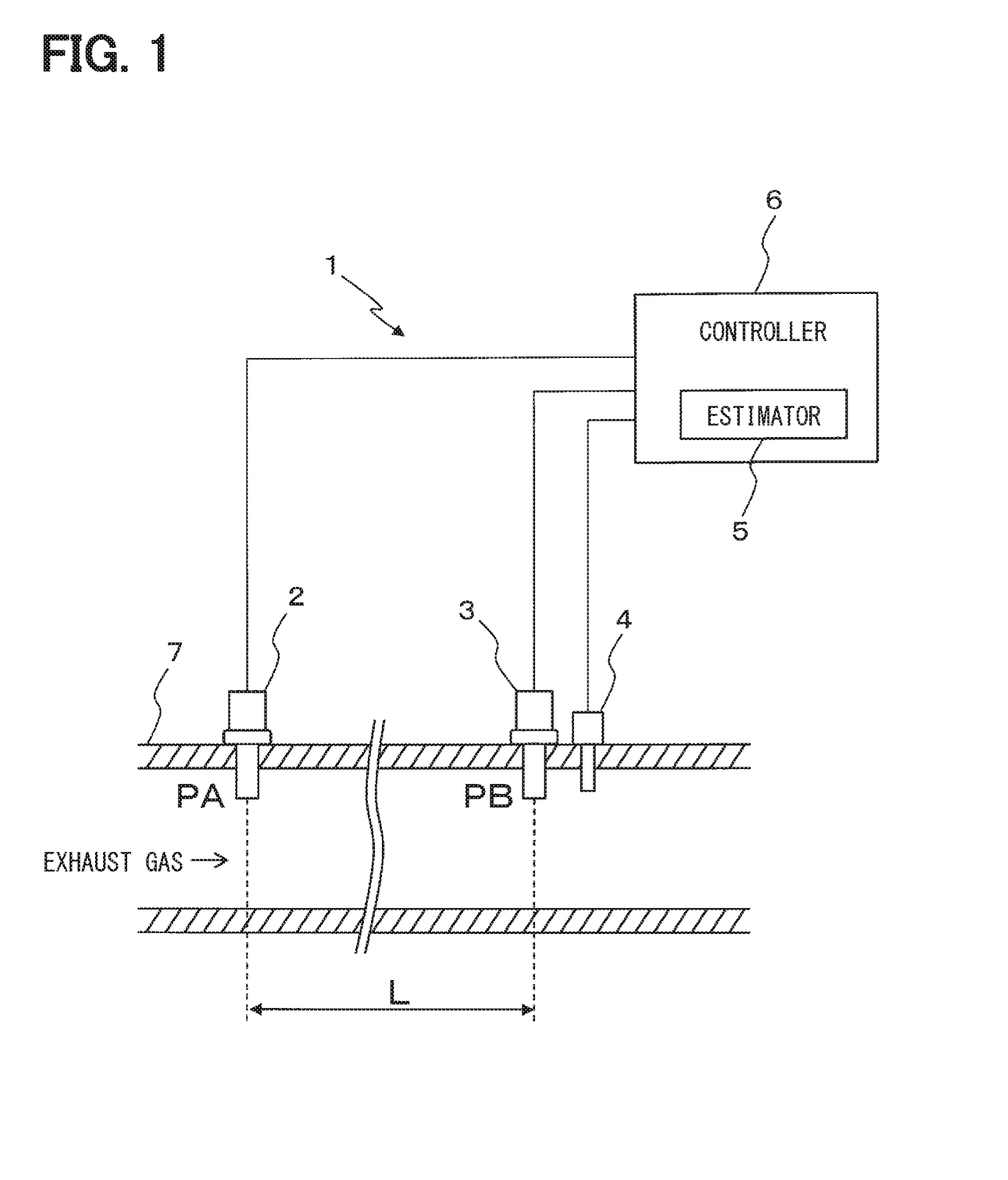
FIG. 1 is a schematic diagram illustrating a configuration of a water-content estimation device according to an embodiment.

Hereinafter, one embodiment will be described with reference to the drawings. As shown in FIG. 1, an estimation device 1 which estimates water content in exhaust gas according to the present embodiment includes a detection sensor 2, a determination sensor 3, a temperature sensor 4, and a controller 6 having an estimator 5. The detection sensor 2 is provided at a detection position (PA) (first position) where a concentration of the exhaust gas is to be detected in an exhaust passage 7 through which the exhaust gas flows, and detects a first gas concentration (detection gas concentration) which is the concentration of the exhaust gas at the detection position (PA). The detection position (PA) is set at a position where a temperature of the exhaust gas is 100° C. or less in the exhaust passage 7.

The determination sensor 3 is provided at a determination position (PB) (second position) downstream of the detection position (PA) in flow of the exhaust gas and separated by a predetermined distance (L) from the detection position (PA). The distance (L) is a length in which the gas concentration detected at the determination position (PB) is considered to be changed from the gas concentration detected at the detection position (PA). In other words, the distance (L) is set to a length in which water is considered to condense between the detection position (PA) and the determination position (PB). The determination sensor 3 detects a second gas concentration (determination gas concentration) which is the concentration of the exhaust gas at the determination position (PB). Therefore, there is a difference between the second gas concentration and the first gas concentration.

The temperature sensor 4 is provided at the determination position (PB), and detects a determination gas temperature (TB) which is the temperature of the exhaust gas at the determination position (PB). The position where the temperature of the exhaust gas is 100° C. or less can be set based on a structure of the exhaust passage 7 of the combustion apparatus, an expected combustion condition, or a mechanical or control state of the combustion apparatus or its peripheral structure. The determination position (PB) can also be set by measuring the temperature of the exhaust gas at the time of combustion test or the like.

The controller 6 is formed of, for example, a microcomputer (e.g. microcontroller), and the estimator 5 of the controller 6 executes a process of estimating the water content at the detection position (PA), which will be described in detail later. The controller 6 also executes a process of combustion control of the combustion apparatus (see FIG. 2). For example, the controller 6 may control an adjustment in ratio of air and fuel in an air-fuel mixture supplied to the combustion apparatus. More specifically, the controller 6 may control an amount of air in the air-fuel mixture supplied to the combustion apparatus. Thus, in the present embodiment, the estimation device 1 has a configuration in which the controller 6 of the combustion apparatus has a function of estimating the water content.

Figure 2:
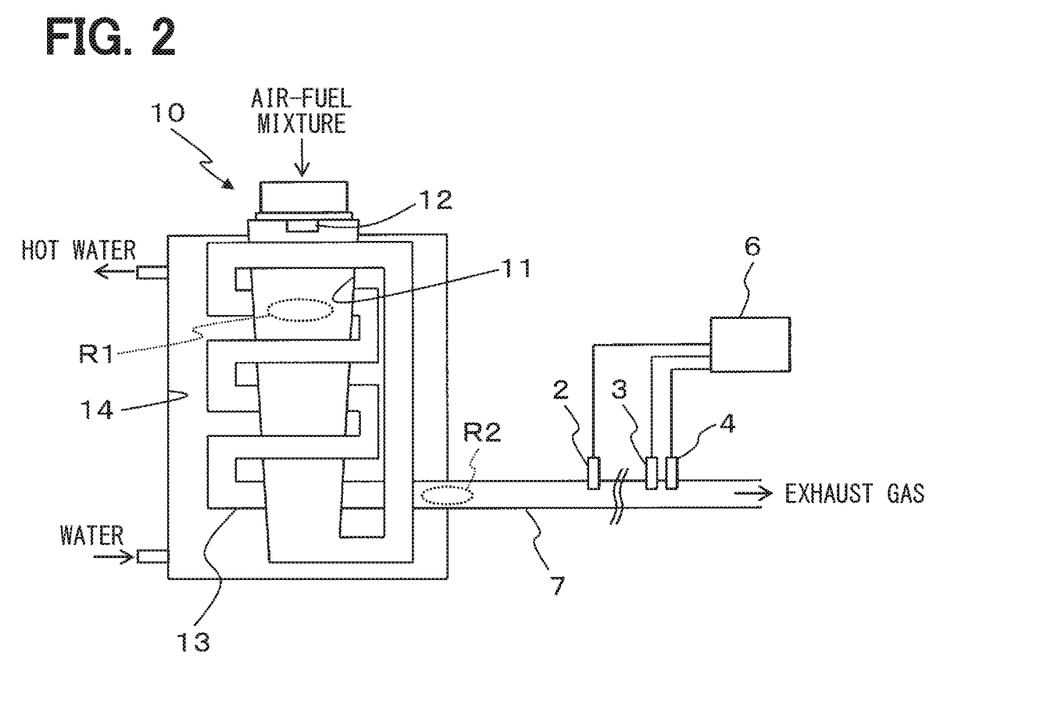
FIG. 2 is a schematic diagram illustrating an example of a configuration of a combustion apparatus.

The estimation device 1 detects a gas concentration in the exhaust passage 7 of the combustion apparatus such as a gas water heater 10. The estimation device 1 detects a concentration of a predetermined gas component, such as an oxygen concentration, a carbon monoxide concentration, or a nitrogen oxide concentration. In the present embodiment, it is assumed that the estimation device 1 detects oxygen concentration.

The gas water heater 10 is supplied with a mixture of fuel and air. The air-fuel mixture is burned by a burner 12 in a combustion chamber 11. High-temperature gas flows in a heat exchanger 13, and water is supplied into a tank 14. Accordingly, hot water can be obtained. In order to perform the combustion control of this gas water heater 10, the estimation device 1 detects gas concentration in a predetermined detection position.

Next, the effects of the configuration described above will be explained. For example, in the case of so-called city gas, the gas water heater 10 uses natural gas (methane CH4) as fuel. The mixture of fuel and air is supplied to the gas water heater 10, and a supply of the air is excessive with respect to a supply of the fuel in order to prevent incomplete combustion. Hereinafter, the ratio of the excessively supplied air to the supplied fuel will be described as an excess air amount (N). In the case of the gas water heater 10, a target value of the excess air amount (N) is set to about 1.3, but it is not measured what value it actually is.

Figure 4:
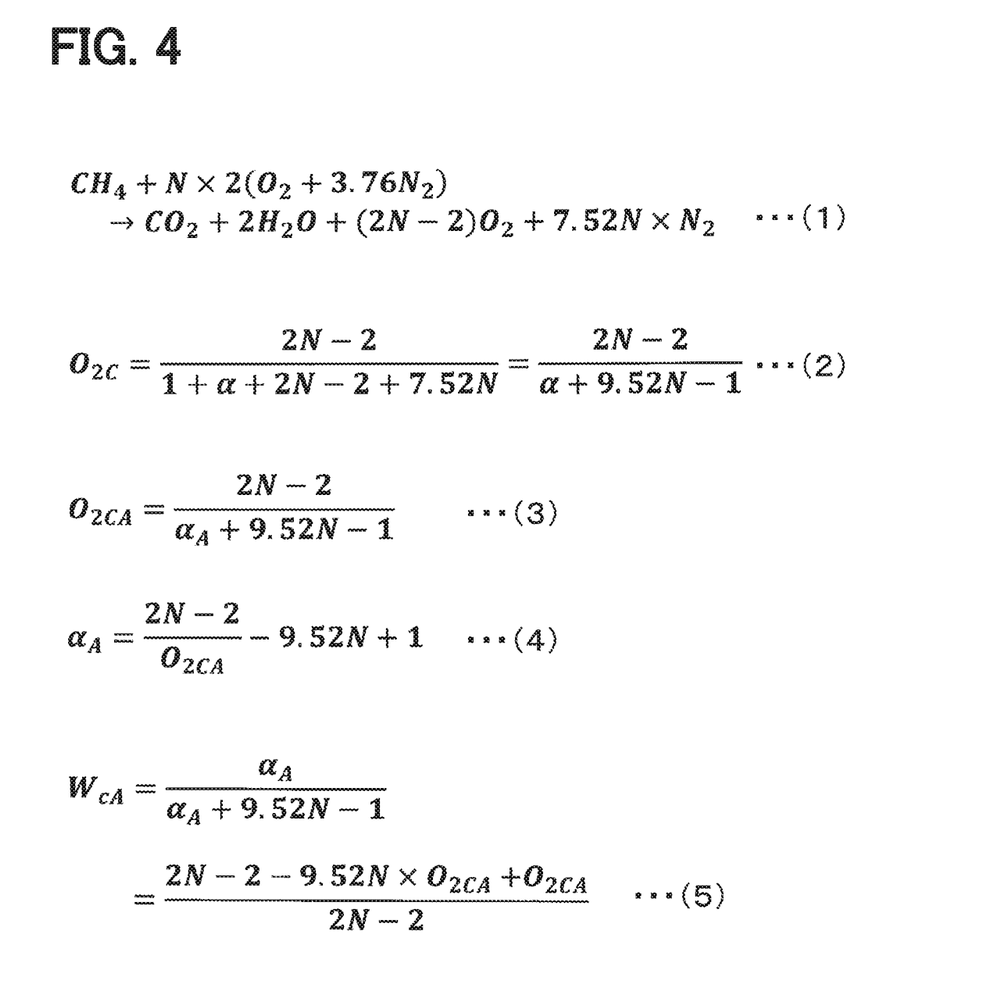
FIG. 4 is a diagram showing formulae used for calculation.

When the supplied air is assumed to be a gas containing oxygen ($O_2$) and nitrogen ($N_2$) in a ratio of 1:3.76, and methane as the fuel is completely burned, the chemical reaction formula is Formula (1) in FIG. 4. As shown in the Formula (1), when the fuel is completely burned, water ($H_2O$) is generated.

Since water evaporates at 100° C. as is well known, the water exists as gas in a location where the temperature of the exhaust gas is 100° C. or higher, for example, in a region (R1) shown in FIG. 2. On the other hand, a part of the water condenses and becomes liquid in a location where the temperature of the exhaust gas is 100° C. or lower, for example, in a region (R2) in FIG. 2. Therefore, the concentrations of gas components change depending on an amount of gaseous water, i.e. a water content in the exhaust gas. For example, assuming that the number of moles of the gaseous water is α, the oxygen concentration ($O_{2C}$) can be obtained by Formula (2) in FIG. 4 based on the Formula (1). α changes in the range of $0 \leq \alpha \leq 2$ depending on the temperature.

In order to correctly determine the oxygen concentration at an arbitrary position, it is necessary to obtain the water content, that is, a, and to obtain the unknown excess air amount (N). Therefore, the estimation device 1 obtains the water content at the arbitrary detection position (PA) as described below.

The oxygen concentration ($O_{2CA}$) at the detection position (PA) can be obtained by the Formula (3) shown in FIG. 4 when the number of moles of gaseous water at the detection position (PA) is defined as $\alpha_A$. Thus, $\alpha_A$ can be obtained by Formula (4) shown in FIG. 4. Further, the water content ($W_{CA}$) at the detection position (PA) can be obtained by the Formula (5) shown in FIG. 4, which is derived from the Formula (1) and (3) or (4).

Figure 5:
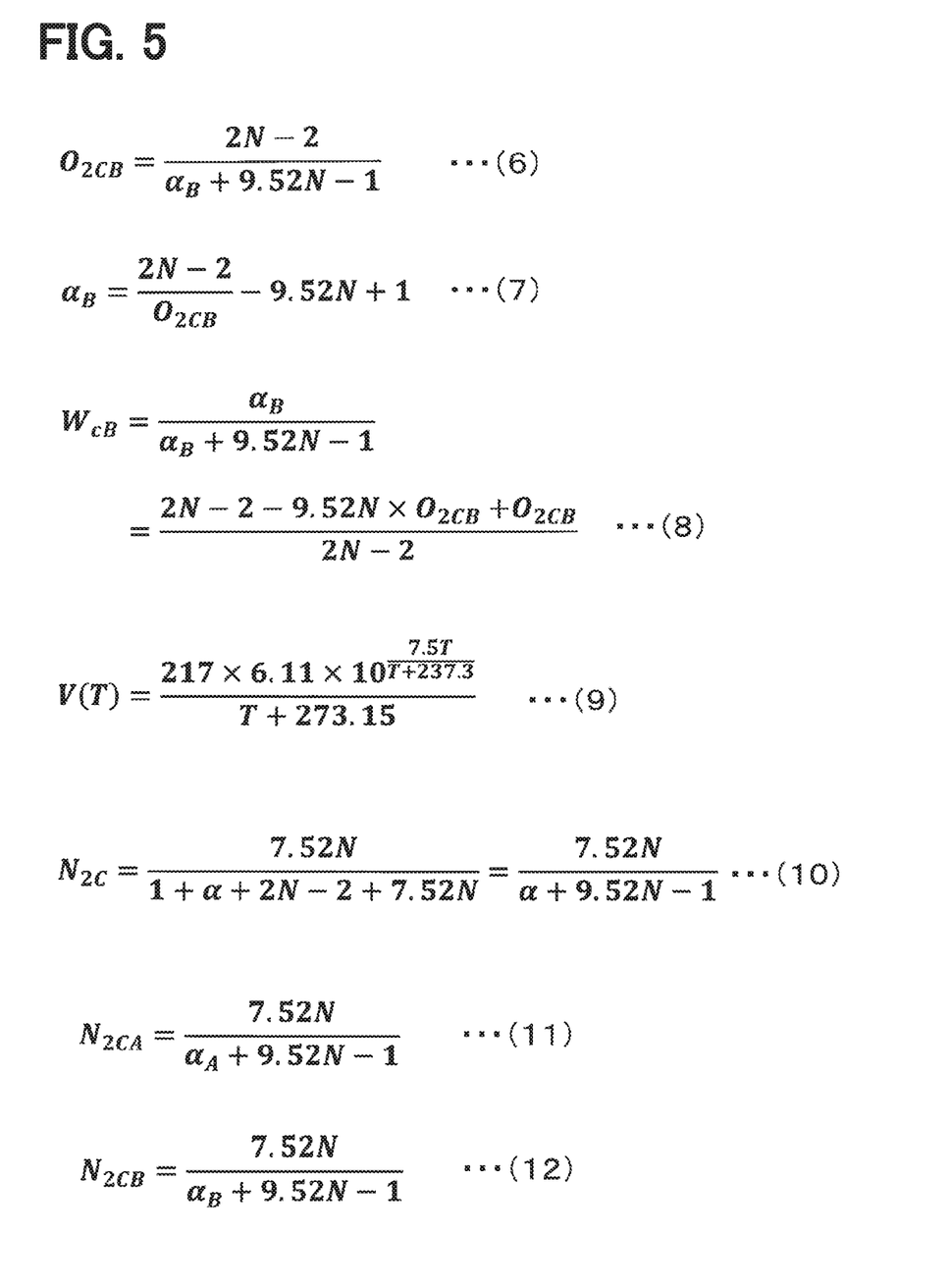
FIG. 5 is a diagram showing formulae used for calculation.

The oxygen concentration ($O_{2CB}$) at the determination position (PB) can be obtained by the Formula (6) shown in FIG. 5 when the number of moles of gaseous water at the determination position (PB) is defined as $\alpha_B$. Thus, $\alpha_B$ can be obtained by Formula (7) shown in FIG. 5. Further, the water content ($W_{CB}$) at the determination position (PB) can be obtained by the Formula (8) shown in FIG. 5, which is derived from the Formula (1) and (6) or (7).

Figure 3:
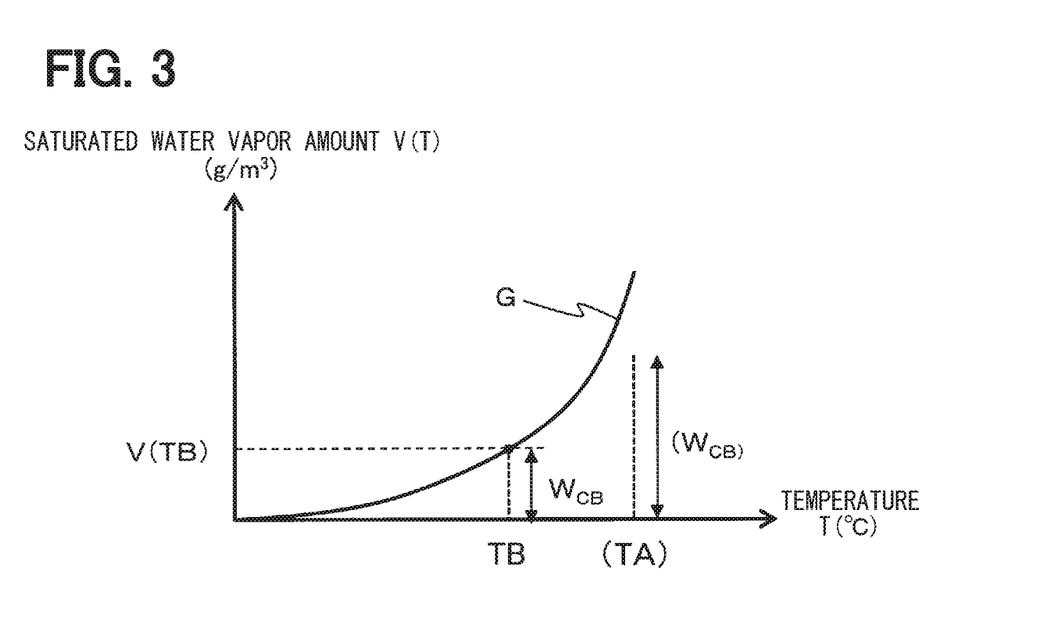
FIG. 3 is a graph showing a saturated water vapor curve.

The determination position (PB) is set at a position where the temperature of the exhaust gas is less than 100° C. In the case of the gas water heater 10, for example, immediately after the exhaust gas is generated in the combustion chamber, heat is taken away from the surrounding water via the heat exchanger. The water temperature in the tank of the water heater is controlled so as to be kept constant at about 70 to 80° C. In such tank type, the amount of water to be controlled is large relative to the heat quantity of the exhaust gas. Thus, the heat of the exhaust gas is rapidly taken away and the temperature of the exhaust gas becomes 100° C. or less. Therefore, a part of water generated by the combustion is considered to exist in a condensed state at the determination position (PB). In other words, at the determination position (PB), water is considered to be saturated in the exhaust gas as in the saturated water vapor curve (G) shown in FIG. 3.

However, even if the temperature becomes 100° C. or less, the water may not be saturated. Therefore, in the present embodiment, a difference between the first gas concentration at the detection position (PA) and the second gas concentration at the determination position (PB) is calculated. When there is a difference between the first gas concentration and the second gas concentration, the water vapor is determined to be saturated at the determination position (PB). When the water vapor is determined to be saturated at the determination position (PB), the saturated water vapor amount at the determination position is determined as the water content at the determination position (PB). This is because it can be considered that the difference in gas concentration between the detection position (PA) and the determination position (PB) is caused by change of the water content in the exhaust gas. For example, when the difference between the first gas concentration at the detection position (PA) and the second gas concentration at the determination position (PB) is larger than or equal to a predetermined value P, the saturated water vapor amount at the determination position may be determined as the water content at the determination position (PB).

The water content in the exhaust gas changes when the water vapor condenses to become water, and in that state, it is considered that the water content in the exhaust gas is saturated. Therefore, it is determined whether the water is condensed at the determination position (PB) by determining whether there is a difference between the first gas concentration and the second gas concentration. That is, it is determined whether the saturated water vapor amount can be used as the water content for the calculation. Accordingly, it is possible to prevent the water content from being erroneously calculated in a state where the water vapor is not saturated.

The temperature of the exhaust gas is detected as the determination gas temperature (TB) at the determination position (PB). Thus, for example, the saturated water vapor amount (V(TB)) at the detected determination gas temperature (TB) can be obtained by the Tetens equation shown as the Formula (9) in FIG. 5. Since this saturated water vapor amount (V(TB)) is equal to the water content ($W_{CB}$) shown in the Formula (8), the excess air amount (N) can be obtained from the Formula (8).

Since the obtained excess air amount (N) corresponds to an amount of the excessively supplied air, the excess air amount (N) becomes the same value at the detection position (PA). Therefore, by substituting the determined excess supply amount (N) into the above-mentioned Formulae (4) and (5), the number of moles ($\alpha_A$) of the gaseous water at the detection position (PA) and the water content ($W_{CA}$) at the detection position (PA) can be calculated. That is, even if the temperature (TA) of the exhaust gas at the detection position (PA) is unknown, and regardless of whether or not the water vapor is saturated at the detection position (PA), the water content at the detection position (PA) can be determined.

Once the number of moles of water ($\alpha_A$) and the water content ($W_{CA}$) at the detection position (PA) are obtained, the actually-measured oxygen concentration ($O_{2CA}$) can be corrected and the estimated water content can be fed back to the combustion control. Therefore, the combustion control can be performed appropriately. That is, the combustion control of the combustion apparatus can be appropriately performed based on the water content ($W_{CA}$) at the detection position. Thus, the estimation device 1 estimates the water content at the detection position based on the detected oxygen concentration and the detected temperature.

Figure 6:
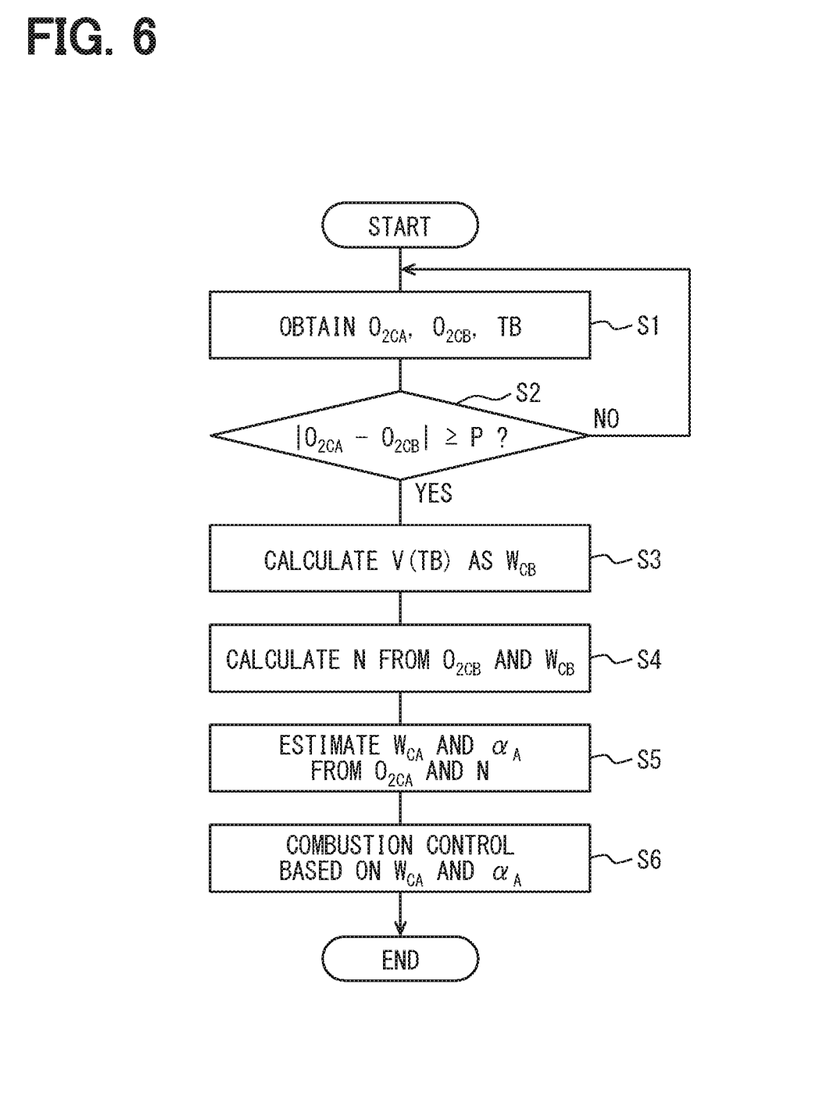
FIG. 6 is a flowchart showing a control process performed by a controller.

According to the estimation method and estimation device for estimating the water content of the exhaust gas described above, the following effects can be obtained. According to the water content estimation method and the estimation device, as shown in the flowchart of FIG. 6, at step S1, the oxygen concentration ($O_{2CA}$) as an example of the first gas concentration at the detection position (PA), the oxygen concentration ($O_{2CB}$) as an example of the second gas concentration at the determination position (PB), and the determination gas temperature (TB) of the exhaust gas at the determination position (PB) are obtained. At step S2, it is determined that whether a difference between the oxygen concentration ($O_{2CA}$) at the detection position (PA) and the oxygen concentration ($O_{2CB}$) at the determination position (PB) is larger than or equal to a predetermined value P. When the difference is larger than or equal to the predetermined value P, the process proceeds to step S3. When the difference is smaller than the predetermined value P, the process returns to step S1. At step S3, based on the determination gas temperature (TB), the saturated water vapor amount (V(TB)) at the determination position (PB) is calculated as the water content ($W_{CB}$) at the determination position (PB). At step S4, based on the chemical reaction formula at the time of combustion of the air-fuel mixture supplied to the combustion apparatus, the excess air amount (N) of the mixture supplied to the combustion apparatus is calculated from the water content (V(TB)=($W_{CB}$)) and the second gas concentration ($O_{2CB}$) at the determination position (PB). At step S5, the water content ($W_{CA}$) at the detection position (PA) and the number of moles ($\alpha_A$) of the gaseous water at the detection position (PA) is estimated from the excess air amount (N) and the first gas concentration ($O_{2CA}$). At step S6, a combustion control of the combustion apparatus is performed based on the estimated water content ($W_{CA}$) at the detection position (PA) and the estimated number of moles ($\alpha_A$) of the gaseous water at the detection position (PA). The control process shown by the flowchart of FIG. 6 may be repeatedly executed by the controller 6 in a predetermined control cycle.

Accordingly, the excess air amount (N) can be specified at the determination position (PB) where the water vapor is saturated. As a result, the water content ($W_{CA}$) at the detection position (PA) and the number of moles ($\alpha_A$) of the gaseous water can be calculated from the oxygen concentration ($O_{2CA}$) detected at the detection position (PA).

The detection position (PA) can be set at an arbitrary position of the exhaust passage 7 since it is sufficient if the oxygen concentration can be detected, that is, the water vapor may be saturated or may not be saturated. Therefore, it is not necessary to set the detection position (PA) to a position exceeding 100° C. at which the evaporation amount becomes constant. It becomes easy to verify the installation position. Furthermore, the risk that the detection sensor 2 is damaged and causes a problem in combustion control is reduced.

Therefore, the degree of freedom of the position where the detection sensor 2 is installed can be increased. Further, estimation of the water content in the exhaust gas pipe for appropriate detection of gas concentration can be performed by the sensor for detecting the gas concentration. Also, even with the estimation device 1 configured as described above, the degree of freedom in the position where the detection sensor 2 is installed can be increased, and the gas concentration can be appropriately detected.

In addition, a difference between the first gas concentration and the second gas concentration is obtained. When there is the difference between the first gas concentration and the second gas concentration, it is determined that the water vapor is saturated at the determination position. In this case, the saturated water vapor amount at the determination position is determined as the water content at the determination position. This is because it can be considered that the difference in gas concentration between the detection position (PA) and the determination position (PB) is caused by change of the water content in the exhaust gas. The water content in the exhaust gas changes when the water vapor condenses to become water, and in that state, it is considered that the water content in the exhaust gas is saturated. Therefore, by determining whether there is a difference between the first gas concentration and the second gas concentration, it can be determined whether the saturated water vapor amount at the determination position is a correct value that can be used for calculation.

Although the example which detects oxygen concentration with the detection sensor 2 was shown in the embodiment, the gas component to be detected is not limited to oxygen, and may be nitrogen. In this case, the above-mentioned Formula (2) for obtaining the oxygen concentration becomes the Formula (10) shown in FIG. 5 when the concentration of nitrogen ($N_2$) is calculated. From the Formulae (10) and (1), the nitrogen concentration ($N_{2CA}$) at the detection position (PA) is calculate by the Formula (11) in FIG. 5. The nitrogen concentration ($N_{2CB}$) at the determination position (PB) is determined by the Formula (12) in FIG. 5. Thus, it is possible to obtain the water content ($W_{CA}$) and the number of moles ($\alpha_A$) of gaseous water at the detection position (PA) can be calculated by the same estimation method as in the above embodiment. As a result, the degree of freedom in the position where the detection sensor 2 is installed can be increased, and the gas concentration can be appropriately detected.

The determination position (PB) is set downstream of the detection position (PA) in flow of the exhaust gas and separated by the predetermined distance (L) from the detection position (PA). Therefore, the determination position (PB) can be appropriately set such that water is saturated at the determination position (PB), that is, the water content can be specified. Moreover, although the gas water heater 10 was illustrated as a combustion apparatus in the above embodiment, the present disclosure is applicable to other combustion apparatuses, such as an engine.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:

1. A method for estimating water content of exhaust gas, the estimation method comprising:
   obtaining a first gas concentration that is a concentration of the exhaust gas detected at a first position in an exhaust passage through which the exhaust gas of a combustion apparatus flows, a second gas concentration that is a concentration of the exhaust gas detected at a second position which is downstream of the first position in the exhaust passage and where a temperature of the exhaust gas is lower than 100° C., and a gas temperature that is the temperature of the exhaust gas detected at the second position;
   calculating a saturated water vapor amount at the gas temperature as a water content at the second position;
   calculating an excess air amount of a fuel-air mixture supplied to the combustion apparatus by using the water content at the second position and the second gas concentration based on a chemical reaction formula of combustion of the mixture;
   estimating a water content at the first position by using the excess air amount and the first gas concentration based on the chemical reaction formula; and
   performing a combustion control of the combustion apparatus based on the water content at the first position.

2. The estimation method according to claim 1, further comprising
   correcting the first gas concentration by using the excess air amount and the estimated water content at the first position based on the chemical reaction formula, wherein
   the combustion control is performed based on the corrected first gas concentration.

3. The estimation method according to claim 2, further comprising
   estimating a number of moles of gaseous water at the first position by using the excess air amount and the first gas concentration based on the chemical reaction formula, wherein
   the correction of the first gas concentration is performed based on the estimated number of moles.

4. The estimation method according to claim 1, wherein
   the calculation of the saturated water vapor amount is performed when a difference between the first gas concentration and the second gas concentration is larger than or equal to a predetermined value.

5. An estimation device for estimating water content of exhaust gas, the estimation device comprising:
   a detection sensor provided at a first position in an exhaust passage through which exhaust gas of a combustion apparatus flows, and configured to detect a first gas concentration which is a concentration of the exhaust gas at the first position;
   a determination sensor provided at a second position which is downstream of the first position in the exhaust passage and where a temperature of the exhaust gas is lower than 100° C., and configured to detect a second gas concentration which is a concentration of the exhaust gas at the second position;
   a temperature sensor provided at the second position and configured to detect a gas temperature which is the temperature of the exhaust gas at the second position; and
   a controller programmed to:
      calculate a saturated water vapor amount at the gas temperature as a water content at the second position;
      calculate an excess air amount of a fuel-air mixture supplied to the combustion apparatus by using the water content at the second position and the second gas concentration based on a chemical reaction formula of combustion of the mixture;
      estimate a water content at the first position by using the excess air amount and the first gas concentration based on the chemical reaction formula; and
      perform a combustion control of the control apparatus based on the water content at the first position.

6. The estimation device according to claim 5, wherein
   the controller is programmed to correct the first gas concentration by using the excess air amount and the estimated water content at the first position based on the chemical reaction formula, and perform the combustion control based on the corrected first gas concentration.

7. The estimation device according to claim 6, wherein
   the controller is programmed to estimate a number of moles of gaseous water at the first position by using the excess air amount and the first gas concentration based on the chemical reaction formula, and correct the first gas concentration based on the estimated number of moles.

8. The estimation device according to claim 5, wherein the controller is programmed to calculate the saturated water vapor amount when a difference between the first gas concentration and the second gas concentration is larger than or equal to a predetermined value.

\* \* \* \* \*